Patented Sept. 26, 1933

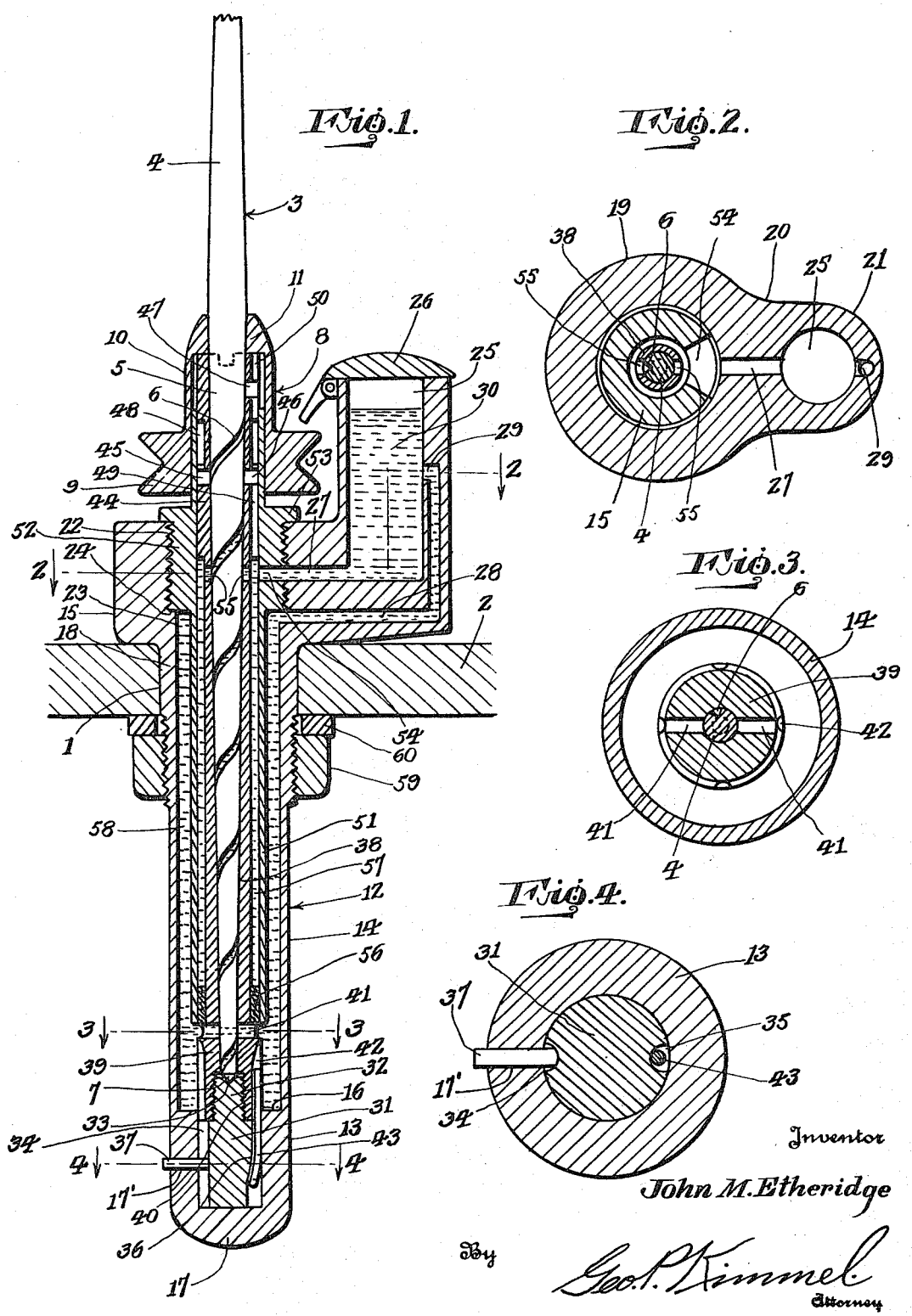

1,928,525

UNITED STATES PATENT OFFICE 1,928,525

COMBINED SELF - LUBRICATING BEARING AND SUPPORTING STRUCTURE FOR BOBBIN SPINDLES

John M. Etheridge, Columbus, Ga.

Application December 21, 1931
Serial No. 582,472

9 Claims. (Cl. 308—169)

My invention relates to a combined self-lubricating bearing and supporting structure for high speed spindles which carry the bobbins of spinning machines.

The essential objects of my invention are to provide, in a manner as hereinafter set forth, a combined bearing and supporting structure of the class referred to for continuously lubricating, without waste of the lubricant a high speed bobbin carrying spindles during the operation of the latter whereby it is maintained cooled which results in prolonging the life thereof; for causing a continuous circulation of the lubricant from and to a lubricant reservoir forming an element of the structure; for confining the lubricant in a manner to prevent the splashing thereof, during the operation of the spindle upon the machine with which the spindle is associated or upon the material being fed to and wound upon the bobbin; for materially reducing the cost of lubricating upkeep for the spindle; and to attain these ends in a comparatively simple, strong, durable, compact, thoroughly efficient, readily assembled and comparatively inexpensive structure.

To the above ends essentially and others which may hereinafter appear, my invention consists of such parts and such combination of parts which fall within the scope of the invention as claimed.

In the drawing:

Figure 1 is a vertical sectional view of a combined self-lubricating bearing and supporting structure, in accordance with my invention for a high speed spindle and showing the adaptation thereof with respect to the latter.

Figure 2 is a section on line 2—2 Figure 1.

Figure 3 is a section on line 3—3 Figure 1.

Figure 4 is a section on line 4—4 Figure 1.

The combined spindle bearing and supporting structure is extended through an opening 1 in a spindle rail 2 and is clamped to the latter in a manner to be presently referred to. A bobbin spindle is indicated generally at 3 and includes oppositely tapered portions 4, 5, the latter being extended into its bearing and supporting structure and is spirally grooved, in its periphery as at 6. The lower end of portion 5 is pointed, as at 7. The whirling element for the spindle 3 is indicated generally at 8 and includes a peripherally grooved annulus 9 adapted to be connected to a driving means, not shown for element 8. Extending from the annulus 9 is a vertical sleeve 10 having an inwardly extending annular flange 11 which is fixedly secured by any suitable means to spindle 3.

My combined self-lubricating bearing and supporting structure for the spindle includes a casing referred to generally at 12 and which comprises a base part 13, an intermediate part 14 and an upper part 15. The parts 13 and 14 are tubular, but the inner diameter of part 13 is less than that of part 14 thereby providing a shoulder 16 at the point of mergence of the said parts. The part 13 has a closed bottom 17 and a diametrically exetnding opening 17'. The upper portion 18 of part 14 is of greater outer diameter than its remaining portion. The lower part of portion 18 is peripherally threaded. The peripheral non-threaded part of portion 18 is arranged in opening 1 of rail 2. The upper part 15 of casing 12 comprises a cylindrical portion 19 of greater outer diameter than part 14, a lateral portion 20 of a width less than the outer diameter of and extended from portion 19 and a vertically disposed cylindrical portion 21 of greater height than portions 19 and 20 and which extends upwardly from the outer end of lateral portion 20. The portion 19 has upon its inner face two different diameters, the largest indicated at 22 is threaded and the smallest indicated at 23 corresponds to the inner diameter of part 14. The setting of the inner face of part 15 upon two different diameters provides a shoulder 24. The portion 21 provides a lubricant reservoir 25 having a hinged closure 26 for the top thereof. The part 15 is formed with a lubricant feed passage 27 which extends from the bottom of reservoir 25, through portion 20 and opens at the threaded part of the inner face of portion 19. The part 15 has a lubricant return passage 28 which leads from the non-threaded part of the inner face of portion 19, through portion 20 below passage 27, through the lower part of portion 21 below reservoir 25 and then upwardly in portion 21 and opens, as at 29 into reservoir 25 above the bottom of the latter. The lubricant is indicated at 30.

Secured within the part 13 is a combined bearing, support and lock member 31 and which has a reduced peripherally threaded portion 32 extended into part 14. The portion 32 at its top is formed with a seat 33 for the pointed lower end 7 of spindle 3. The largest part of member 17 is of a diameter to seat against the inner face of part 31 and is formed with a vertically disposed groove 34 of semi-circular cross section and diametrically opposite the groove 34 the said largest part of member 31 is formed with a vertical groove 35 having a portion of its base or inner wall incurved as indicated at 36. Extending through the opening 17' and engaging in groove 34 is a locking pin 37 for the member 31.

Encompassing the part 5 of spindle 3 is a tubular bolster 38 having its inner face tapered throughout. The bolster is of greater length than part 3 and includes a lower end portion 39 formed with a downwardly opening socket 40 for receiving the reduced portion 32 of member 31. The portion 32 threadedly engages with the wall of socket 40 for locking the bolster 38 and member 31 together. The spindle 3 extends into socket 40 to engage seat 33, the latter providing a bearing for pointed end 7. At a point above the socket 40 bolster 38 is formed with lubricant outlet ports 41. The portion 39 has peripheral lengthwise extending spaced grooves 42 which selectively receive a resilient latch 43 which is anchored to the base of groove 35 and extends above portion 32 of member 31. The upper portion of bolster 38 is enlarged, as at 44 and such portion is formed with lateral openings 45, 46 and 47 and lengthwise grooves 48, 49, 50 which communicate with grooves 45, 46 and 47 respectively and such openings and grooves provide air ducts or passages.

Secured to the threaded inner face of part 15, extended above and depending from the latter is a bushing 51 having its inner diameter corresponding to the outer diameter of portion 44 of bolster 38 and of greater diameter than the outer diameter of bushing 38 below the portion 44 of the latter. The bushing 51 has a portion of its length enlarged, as at 52, and such portion is interposed between the transverse median of the bushing on its upper end. The portion 52 is peripherally threaded, having an outwardly directed annular flange 53 at its top and a lateral opening 54 intermediate its upper and lower ends. The portion 52 is secured to the threaded inner face of part 15 and has its opening 54 registering with the discharge end of passage 27. The bolster 38 is formed with diametrically disposed intake ports 55 which align with opening 54. The bottom of portion 52 of bushing 51 is above passage 28. The bushing 51 extends to a point in close proximity to the outlet ports 41 formed on the bolster 38 and interposed between the latter and bushing 51 adjacent the ports 41 is an airtight packing 56 which closes the bottom of a lubricant receiving space 57 formed between the bushing and bolster.

The casing 12 in connection with that portion of the bushing below the enlarged portion 52 of the latter, the bottom of said portion 52 and the shoulder 16 provides a lubricant well 58 which receives the lubricant through ports 41. The lubricant is conducted from well 58 to reservoir 25 by passage 28.

Carried by the peripherally threaded portion of casing 12 is a clamping nut 59, which in connection with washer 60 and part 15 of casing 12 anchors the combined self lubricating and spindle supporting structure to the rail 2.

The bushing 51 has its upper end arranged below that of the bolster 38. The bushing extends through the annulus 9 and into sleeve 10 and the flange 11 of the latter seats on the top of bolster 38. The spindle whirling element 6 is loosely mounted relative to the bolster and bushing and which permits for the entrance of air to the structure.

The structural arrangement is such that as the spindle begins to speed up, the groove therein will provide for the lubricant to be conducted downwardly. The lubricant will be discharged through the outlets in the bolster into the well, and from the latter it will be conducted to the reservoir whereby a continuous circulation of the lubricant will be had during the operation of the spindle. The lubricant is supplied to the space between the bolster and bushing and from there fed to within the bolster to enter the groove in the spindle.

What I claim is:—

1. In combination, a bolster for the passage of a peripherally grooved rotatable spindle, an open top casing for receiving a part of the bolster and formed with a normally closed reservoir for containing a body of lubricant, means carried by the casing for locking the bolster therewith and for supporting the lower end of the spindle, a bushing extending into and provided intermediate its ends with means secured in the upper end of the casing, said bushing encompassing the bolster, said bushing, bolster and casing having coacting means for feeding lubricant from the reservoir to the spindle, said casing and bushing having coacting means to form a lubricant well, said bolster having lubricant outlet ports opening into said well, and said casing having means for conducting the lubricant from said well to the reservoir.

2. In combination, a bolster for the passage of a peripherally grooved rotatable spindle, an open top casing for receiving a part of the bolster and formed with a normally closed reservoir for containing a body of lubricant, means carried by the casing for locking the bolster therewith and for supporting the lower end of the spindle, a bushing extending into and provided intermediate its ends with means secured in the upper end of the casing, said bushing encompassing the bolster, said bushing, bolster and casing having coacting means for feeding lubricant from the reservoir to the spindle, said casing and bushing having coacting means to form a lubricant well, said bolster having lubricant outlet ports opening into said well, said casing having means for conducting the lubricant from said well to the reservoir, said bolster and bushing having coacting parts to provide a lubricant receiving space, and means for sealing said space from said well.

3. In combination, a bolster for the passage of a peripherally grooved rotatable spindle, an open top casing for receiving a part of the bolster and formed with a normally closed reservoir for containing a body of lubricant, means carried by the casing for locking the bolster therewith and for supporting the lower end of the spindle, a bushing extending into and provided intermediate its ends with means secured in the upper end of the casing, said bushing encompassing the bolster, said bushing, bolster and casing having coacting means for feeding lubricant from the reservoir to the spindle, said casing and bushing having coacting means to form a lubricant well, said bolster having lubricant outlet ports opening into said well, said casing having means for conducting the lubricant from said well to the reservoir, and said bolster having means to provide air intakes to said space and spindle.

4. In combination, a bolster for the passage of a peripherally grooved rotatable spindle, an open top casing for receiving a part of the bolster and formed with a normally closed reservoir for containing a body of lubricant, means carried by the casing for locking the bolster therewith and for supporting the lower end of the spindle, a bushing extending into and provided intermediate its ends with means secured in the upper end of the casing, said bushing encompassing the bolster, said bushing, bolster and casing having coacting means for feeding lubricant from the reservoir to the spindle, said casing and bushing having coacting means to form a lubricant well, said bolster having lubricant outlet ports opening into said well, said casing having means for conducting the lubricant from said well to the reservoir, said bolster and bushing having coacting parts to provide a lubricant receiving space, means for sealing said space from said well, and said bolster having means to provide air intakes to said space and spindle.

5. In combination, a stationary bolster for the passage of a peripheral grooved rotatable spindle, an open top casing having laterally extended means to provide a normally closed reservoir for containing a body of lubricant, a bushing extending into said casing and secured adjacent its upper end to the upper end of the latter, said bolster arranged within and extended above the bushing, said bolster, bushing and casing having coacting means for feeding lubricant from the reservoir to within the bolster for lubricating the spindle, said casing and bushing having coacting means to form a lubricant well, said bolster having lubricant outlet means opening into said well, said casing having means for conducting the lubricant from said well to said reservoir, said bolster and bushing having coacting parts to provide a lubricant receiving space, and said bolster having its upper portion provided with means to form air intakes to said space and spindle.

6. In combination, a stationary bolster for the passage of a peripheral grooved rotatable spindle, an open top casing having laterally extended means to provide a normally closed reservoir for containing a body of lubricant, a bushing extending into said casing and secured to the upper end of the latter, said bolster arranged within and extended above the bushing, said bolster, bushing and casing having coacting means for feeding lubricant from the reservoir to within the bolster for lubricating the spindle, said casing and bushing having coacting means to form a lubricant well, said bolster having lubricant outlet means opening into said well said casing having means for conducting the lubricant from said well to said reservoir, said bolster and bushing having coacting parts to provide a lubricant receiving space, means for sealing said space from said well, and said bolster having its upper portion provided with means to form air intakes to said space and spindle.

7. In a combined self-lubricating bearing and supporting structure for spinning machines, high speed bobbin carrying spindles having bolsters therefor and bushings for the bolsters, a casing for carrying and enclosing a portion of the bushing for the spindle bolster, said casing including a closed base part, an intermediate part and an upper part, said base and intermediate parts being tubular, the former being of less inner diameter than the latter to provide a shoulder, said upper part being cylindrical and of greater outer diameter than said intermediate part and including an extension formed of a laterally disposed portion merging into a vertically disposed cylindrical portion, the latter being chambered to provide a lubricant reservoir, said extension being formed with a lubricant feed passage leading from the reservoir to the inner face of said upper part and a lubricant return passage leading from the inner face of said upper part and opening into said reservoir above the bottom of the latter, said return passage having a part thereof arranged below said feed passage.

8. In combination, a rotatable spindle, a bolster encompassing a portion of the latter, a bushing encompassing the bolster for a portion of its length, an open top casing encompassing said bushing for a portion of its length and having the bushing at a point intermediate its length secured therewith, said casing having a chambered portion providing a reservoir, said bushing and bolster having coacting means to provide a lubricant receiving space, said bushing having a portion spaced from the casing to provide a lubricant well, means interposed between the bushing and bolster for sealing one end of said space, said casing and bushing having means for establishing communication between the reservoir and said space, said bolster having means for the passage of lubricant from said space to the spindle, said bolster having means for establishing communication between the spindle and said well, and said casing having means for establishing communication between the well and reservoir.

9. In a combined self-lubricating bearing and supporting structure for high speed spindles carrying bobbins of spinning machines, a casing provided with a socket at one end, a bearing element for the lower end of the spindle mounted in said socket and having a reduced peripherally threaded portion having a seat for said lower end, a spindle bolster having a downwardly opening socket receiving and secured to said reduced portion, a locking pin for said element, a resilient latch between said bolster and element, a bushing encompassing said bolster, and said bolster, bushing and casing having means for supplying a lubricant to and conducting it from the spindle.

JOHN M. ETHERIDGE.